(12) United States Patent
Sahara et al.

(10) Patent No.: US 10,621,459 B2
(45) Date of Patent: Apr. 14, 2020

(54) IMAGE PROCESSING APPARATUS AND METHOD FOR BINARIZATION OF IMAGE DATA ACCORDING TO ADJUSTED HISTOGRAM THRESHOLD INDEX VALUES

(71) Applicant: BROTHER KOGYO KABUSHIKI KAISHA, Nagoya, Aichi (JP)

(72) Inventors: Shinya Sahara, Aichi (JP); Toshiki Motoyama, Konan (JP)

(73) Assignee: BROTHER KOGYO KABUSHIKI KAISHA, Nagoya, Aichi (JP)

( * ) Notice: Subject to any disclaimer, the term of this patent is extended or adjusted under 35 U.S.C. 154(b) by 0 days.

(21) Appl. No.: 15/459,433

(22) Filed: Mar. 15, 2017

(65) Prior Publication Data

US 2017/0286797 A1  Oct. 5, 2017

(30) Foreign Application Priority Data

Mar. 29, 2016  (JP) .................................. 2016-064977

(51) Int. Cl.
*G06K 9/38* (2006.01)
*G06K 9/46* (2006.01)
*G06K 9/18* (2006.01)

(52) U.S. Cl.
CPC ................. *G06K 9/38* (2013.01); *G06K 9/18* (2013.01); *G06K 9/4642* (2013.01); *G06K 9/4652* (2013.01); *G06K 2209/01* (2013.01)

(58) Field of Classification Search
CPC ........... G06K 9/38; G06K 9/18; G06K 9/4652
See application file for complete search history.

(56) References Cited

U.S. PATENT DOCUMENTS 5,034,991 A * 7/1991 Hagimae ............... G06K 9/3283
382/171
5,315,409 A * 5/1994 Matsumura ............ G06K 9/38
358/448
5,400,415 A * 3/1995 Kobayashi ............ G06K 9/38
382/271

(Continued)

FOREIGN PATENT DOCUMENTS

JP H05-284356 A 10/1993
JP 2001-118031 A 4/2001

*Primary Examiner* — Pinalben Patel
(74) *Attorney, Agent, or Firm* — Scully Scott Murphy and Presser

(57) ABSTRACT

An image processing apparatus has a color image, the image data being constituted by multiple pixels, each of the multiple pixels having a gradation value, and a controller, which is configured to generate a histogram of index values corresponding to brightness values of the multiple pixels constituting the image data, set an original threshold value based on the histogram which is referred to for binarization, detect a mound-shaped part, in the histogram, satisfying a particular condition, set an adjusting direction in which the original threshold value is to be adjusted, set the index value at a base on a particular direction side of a particular mound-shaped part which is one of mound-shaped parts existing on the adjusting direction side with respect to the original threshold value in the histogram as an adjusted threshold value, and apply a binarizing process to the image data using the adjusted threshold value.

12 Claims, 8 Drawing Sheets

(56) References Cited

U.S. PATENT DOCUMENTS

| | | | | |
|---|---|---|---|---|
| 5,699,454 | A * | 12/1997 | Nakai | G06K 9/38 |
| | | | | 358/464 |
| 5,768,441 | A * | 6/1998 | Yoshizawa | G06K 9/38 |
| | | | | 358/464 |
| 6,333,788 | B1 * | 12/2001 | Yamada | G06K 9/38 |
| | | | | 358/1.15 |
| 6,347,156 | B1 * | 2/2002 | Kamada | G06K 9/38 |
| | | | | 358/1.9 |
| 2005/0274808 | A1 * | 12/2005 | Olmstead | G06K 7/10851 |
| | | | | 235/462.25 |
| 2006/0222205 | A1 * | 10/2006 | Porikli | G06K 9/32 |
| | | | | 382/103 |
| 2010/0061633 | A1 * | 3/2010 | Ma | G06K 9/38 |
| | | | | 382/176 |
| 2010/0246884 | A1 * | 9/2010 | Chen | G06T 7/0012 |
| | | | | 382/103 |
| 2014/0093150 | A1 * | 4/2014 | Zalev | G06T 7/0012 |
| | | | | 382/131 |
| 2014/0327702 | A1 * | 11/2014 | Kreeger | G06T 11/006 |
| | | | | 345/634 |
| 2017/0140203 | A1 * | 5/2017 | Naito | G06K 9/00503 |

* cited by examiner

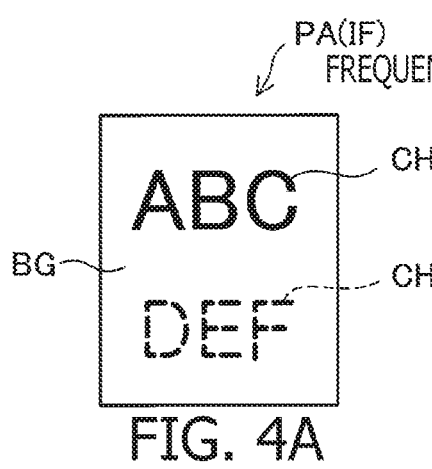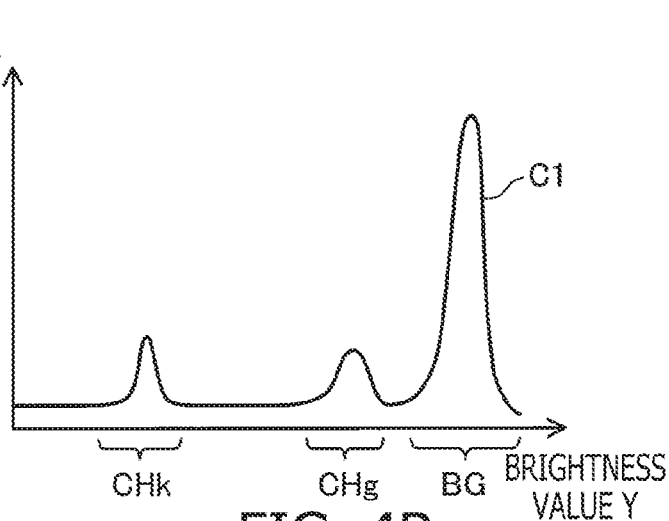
FIG. 4A
FIG. 4B
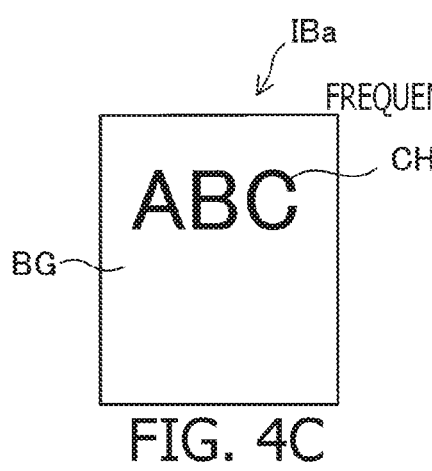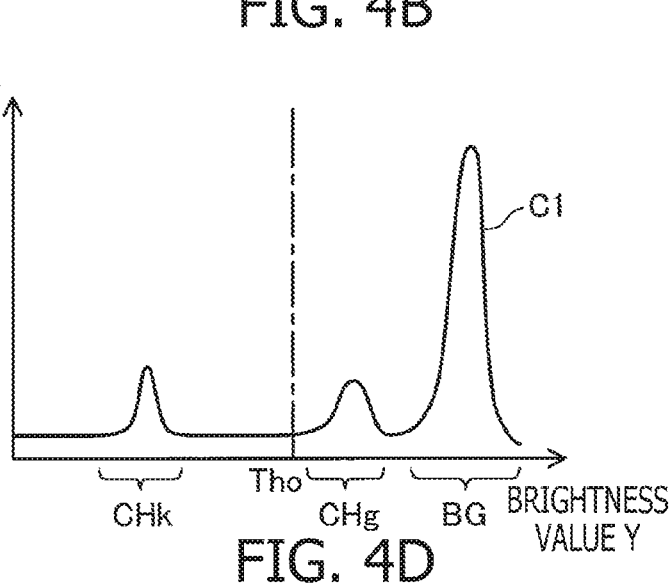
FIG. 4C
FIG. 4D
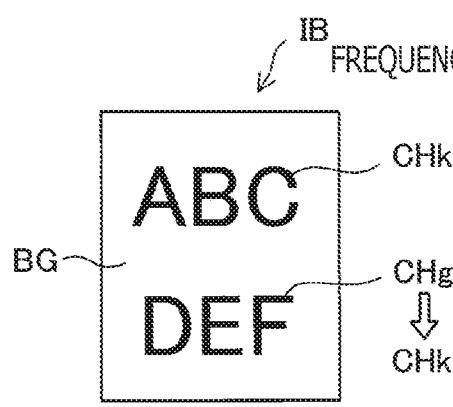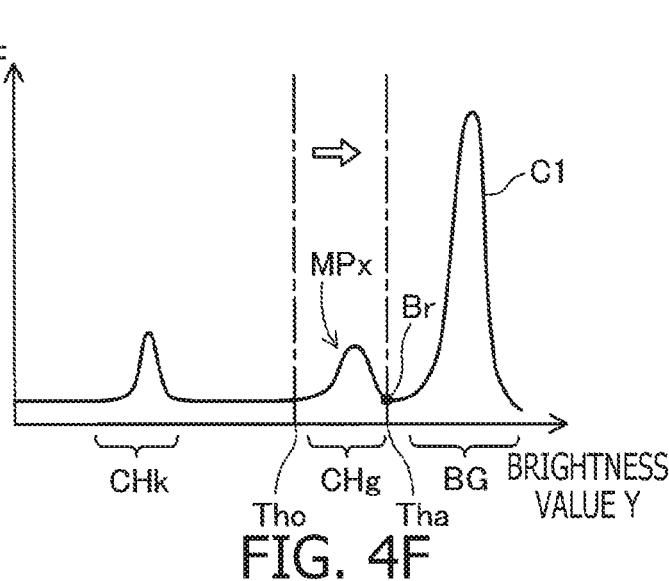
FIG. 4E
FIG. 4F

IMAGE PROCESSING APPARATUS AND METHOD FOR BINARIZATION OF IMAGE DATA ACCORDING TO ADJUSTED HISTOGRAM THRESHOLD INDEX VALUES

CROSS-REFERENCE TO RELATED APPLICATIONS

This application claims priority under 35 U.S.C. § 119 from Japanese Patent Application No. 2016-064977 filed on Mar. 29, 2016. The entire subject matter of the application is incorporated herein by reference.

BACKGROUND

Technical Field

The present disclosures relate to an image processing apparatus and an image processing method.

Related Art

A binarizing process is known as one of image processing to be applied to image data. In the binarizing process, each of pixels constituting image data (e.g., multi-value image data) expressed in multi steps (e.g., 256 steps) of gradation expression is converted into a white pixel having a gradation value representing a white color, or a black pixel having a gradation value representing a black color by comparing the value of each pixel with a threshold value. As a result of the binarization of each pixel, image data consisting of white and black pixels (i.e., binarized image data) is generated. The binarizing process may be executed, for example, to reduce the size of the image data, or as a pre-process for a particular image processing (e.g., a character recognition using an OCR function).

As a method of setting threshold values used in a binarizing process, a discrimination analysis method (Otsu method) is well known. According to the discrimination analysis, in a histogram of brightness values of pixels constituting image data, a threshold value A is set to divide the histogram into two classes, and calculate a ratio of an inter-class distribution to an in-class distribution (i.e., inter-class distribution/in-class distribution). By varying the threshold value A from the minimum value to the maximum value to determine the threshold value A at which the ratio of the inter-class distribution to the in-class distribution, and use the thus determined threshold value as the threshold to be used for binarizing process.

Conventionally, in order to obtain a desired result in binarizing process, there has been known a technique to adjust the threshold value determined in accordance with the discrimination analysis method by apply an offset to the thus determined threshold value.

SUMMARY

According to the conventional technique, however, desired results may not be obtained depending on image data subject to the binarizing process. For example, pixels of a character having a color close to a color of a background of an image may be converted to white pixels, but not black pixels, thereby the character disappearing in the image data after the binarizing process has been applied (i.e., in binarized image data). Another problem is that the pixels of portions among lines constituting small characters and having the background color may be converted to the black pixel, but not to the white pixels, thereby the characters being collapsed and blackened in the binarized image data.

According to aspects of the disclosures, there is provided an image processing apparatus, which is provided with a storage configured to store image data representing a color image, the image data being constituted by multiple pixels, each of the multiple pixels having a gradation value and a controller. The controller is configured to generate a histogram index values corresponding to quantities of the brightness values of the multiple pixels constituting the image data stored in the storage, set an original threshold value of the index value based on the histogram which is referred to for binarization, detect a mound-shaped part, in the histogram, satisfying a particular condition, set an adjusting direction in which the original threshold value is to be adjusted, set the index value at a base on a particular direction side of a particular mound-shaped part which is one of mound-shaped parts existing on the adjusting direction side with respect to the original threshold value in the histogram as an adjusted threshold value, and apply a binarizing process to the image data using the adjusted threshold value.

According to aspects of the disclosures, there is also provided an image processing method employed in an image processing apparatus having a storage configured to store image data representing a color image, the image data being constituted by multiple pixels, each of the multiple pixels having a gradation value. The method includes generating a histogram index values corresponding to quantities of the brightness values of the multiple pixels constituting the image data stored in the storage, setting an original threshold value of the index value based on the histogram which is referred to for binarization, detecting a mound-shaped part, in the histogram, satisfying a particular condition, setting an adjusting direction in which the original threshold value is to be adjusted, setting the index value at a base on a particular direction side of a particular mound-shaped part which is one of mound-shaped parts existing on the adjusting direction side with respect to the original threshold value in the histogram as an adjusted threshold value, and applying a binarizing process to the image data using the adjusted threshold value.

BRIEF DESCRIPTION OF THE ACCOMPANYING DRAWINGS

FIGS. 4A-4F illustrate examples of the binarizing process according to the illustrative embodiment.

DETAILED DESCRIPTION OF THE EMBODIMENTS

It is noted that various connections are set forth between elements in the following description. It is noted that these connections in general and, unless specified otherwise, may be direct or indirect and that this specification is not intended to be limiting in this respect. Aspects of the present disclosure may be implemented on circuits (such as application specific integrated circuits) or in computer software as programs storable on computer-readable media including but not limited to RAMs, ROMs, flash memories, EEPROMs, CD-media, DVD-media, temporary storages, hard disk drives, floppy drives, permanent storages, and the like.

A. Illustrative Embodiment

A-1. Configuration of Image Processing System

Figure 1:
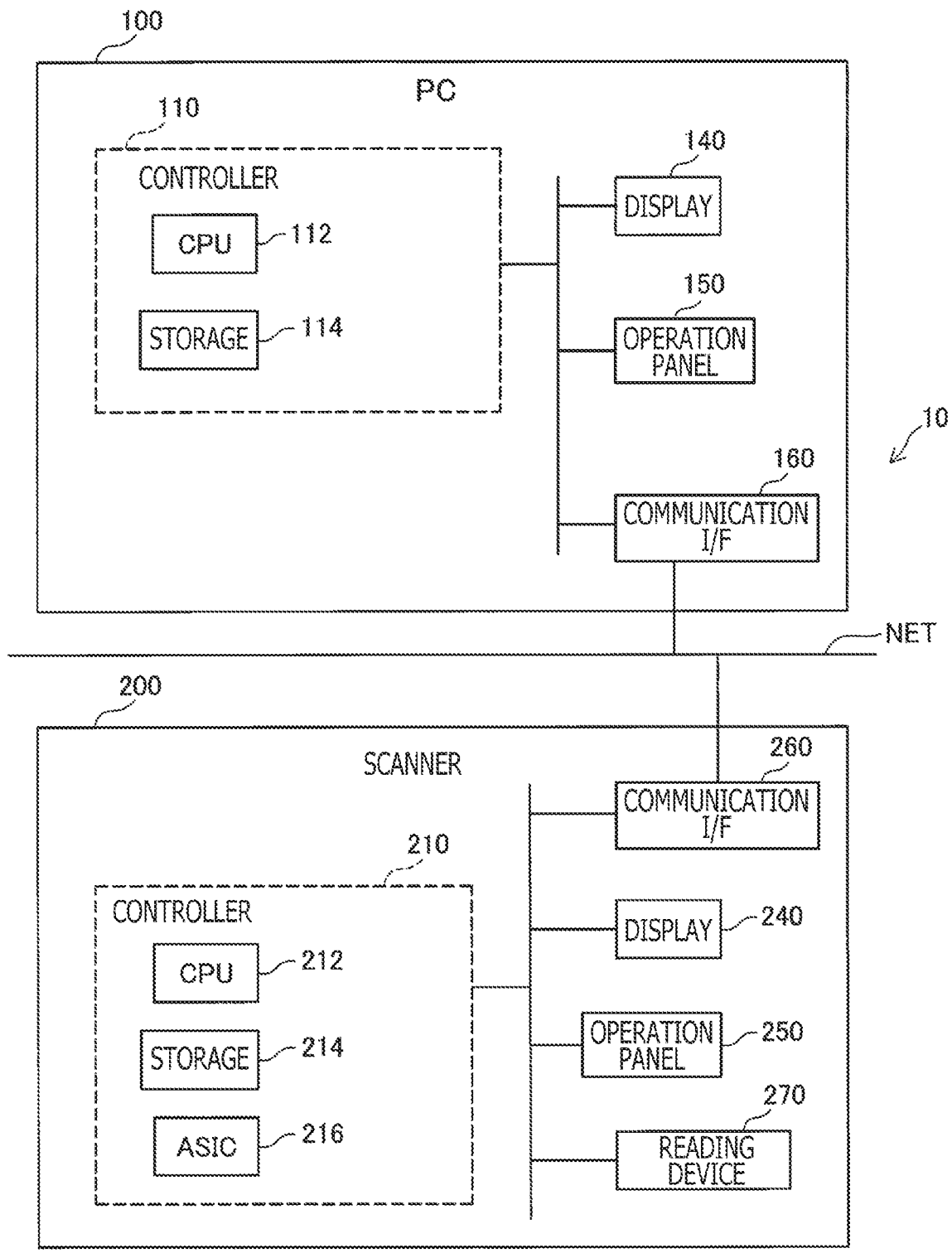
FIG. 1 is a block diagram showing a configuration of an image processing system according to an illustrative embodiment of the disclosures.

FIG. 1 shows a configuration of an image processing system 10 according to an illustrative embodiment of the disclosures. The image processing system 10 has a scanner 200 configured to read an image on an original and generates image data representing the read image, and a personal computer (hereinafter, referred to as a PC) 100 configured to control operations of the scanner 100. The PC 100 and the scanner 200 are connected through, for example, a network NET, so that a data communication can be executed therebetween. It is noted that the scanner 200 is an example of an image processing apparatus.

The PC 100 includes a controller 110, a display 140, an operation panel 150, a communication I/F 160, which are interconnected through a bus or the like. The controller 110 includes a CPU (central processing unit) 112 and a storage 114.

The operation panel 150 of the PC 100 has, for example, a mouse and a keyboard (not shown) with which a user can input instructions to the PC 100. The display 140 includes, for example, an LCD (liquid crystal display) and displays various screens. The communication I/F 160 is hardware configured to communicate with the scanner 200 and/or other equipment in accordance with a wired or wireless communication method.

The storage 114 of the PC 100 includes a ROM (read only memory) and a RAM (random access memory), and stores various programs and/or serves as a work area when the programs are executed and a temporary storage area to temporarily store data during execution of the programs. According to the illustrative embodiment, the storage 114 includes, at least, a scanner driver which is software controlling operations of the scanner 200. As the CPU 112 executes the programs retrieved from the storage 114, various functions of the controller 110 are realized.

The scanner 200 includes a controller 210, a display 240, an operation panel 250, a communication I/F 260 and a reading device 270, which are interconnected through a bus or the like. The controller 210 includes a CPU 121, a storage 214 and an ASIC (application specific integrated circuit) 216.

The reading device 270 of the scanner 200 is an image sensor configured to read the original in accordance with a contact sensor type reading method or an optical reduction type reading method. The display 240 includes, for example, an LCD and displays various setting screens and/or operation states of the scanner 200. The operation panel 250 is provided with multiple buttons (not shown) to receive user's instructions. It is noted that the operation panel 250 may be a touch panel overlaid on a displaying face of the display 240. The communication I/F 250 is hardware configured to communicate with PC 100 and other equipment in accordance with the wired or wireless communication method.

The storage 214 of the scanner 200 includes a ROM storing various programs, and a RAM used as a work area when the CPU 212 executes the programs and/or a temporary storage for data which is generated when the CPU 212 executes the programs. The CPU 212 is configured to execute particular operations in accordance with programs retrieved from the storage 214. The ASIC 216 is a hard circuit configured to process image data. The controller 210 including the above components realizes various functions.

Figure 2:
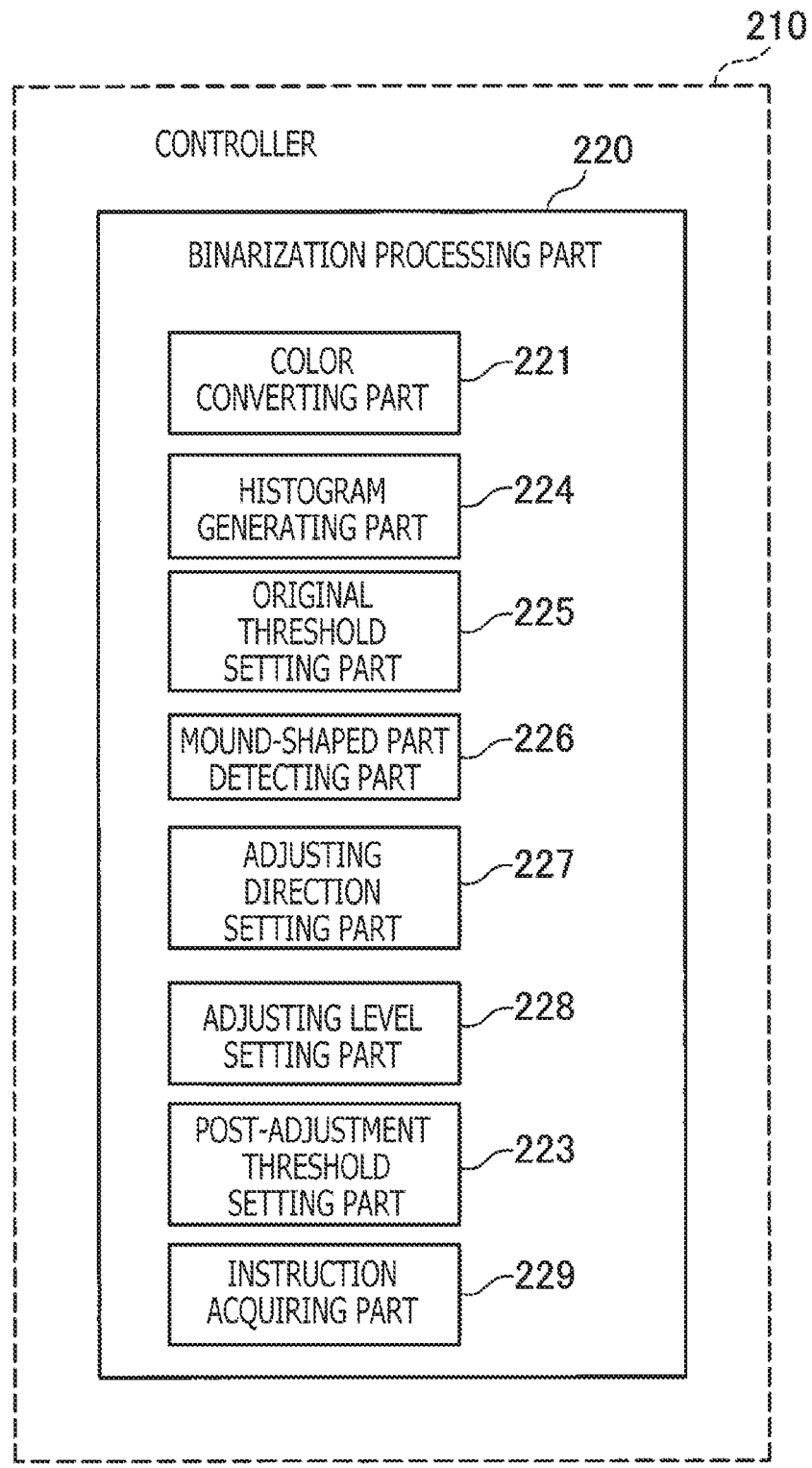
FIG. 2 is a block diagram showing functions realized by a controller of a scanner according to the illustrative embodiment of the disclosures.

FIG. 2 is a block diagram schematically illustrating functions realized by the controller 210 of the scanner 200. The controller 210 serves as a binarization processing part 220. Further, the binarization processing part 220 includes a color converting part 221, a post-adjustment threshold setting part 223, a histogram generating part 224, an original threshold setting part 225, a mounting part detecting part 226, an adjusting direction setting part 227, an adjusting level setting part 228 and an instruction acquiring part 229. Functions of respective parts mentioned above will be described below.

A-2. Binarizing Process

The scanner 200 according to the illustrative embodiment is configured to execute the binarizing process. In the binarizing process, each of pixels constituting image data (e.g., multi-value image data) expressed by multi steps (e.g., 256 steps) of gradation expression is converted into a white pixel having a gradation value representing a white color or a black pixel having a gradation value representing a black color by comparing the value of each pixel with a threshold value. As a result of the binarization of each pixel, image data consisting of white and black pixels (i.e., binarized image data) is generated. The binarizing process may be executed, for example, to reduce the size of the image data, or as a pre-process for a particular image processing (e.g., a character recognition using an OCR function).

Figure 3:
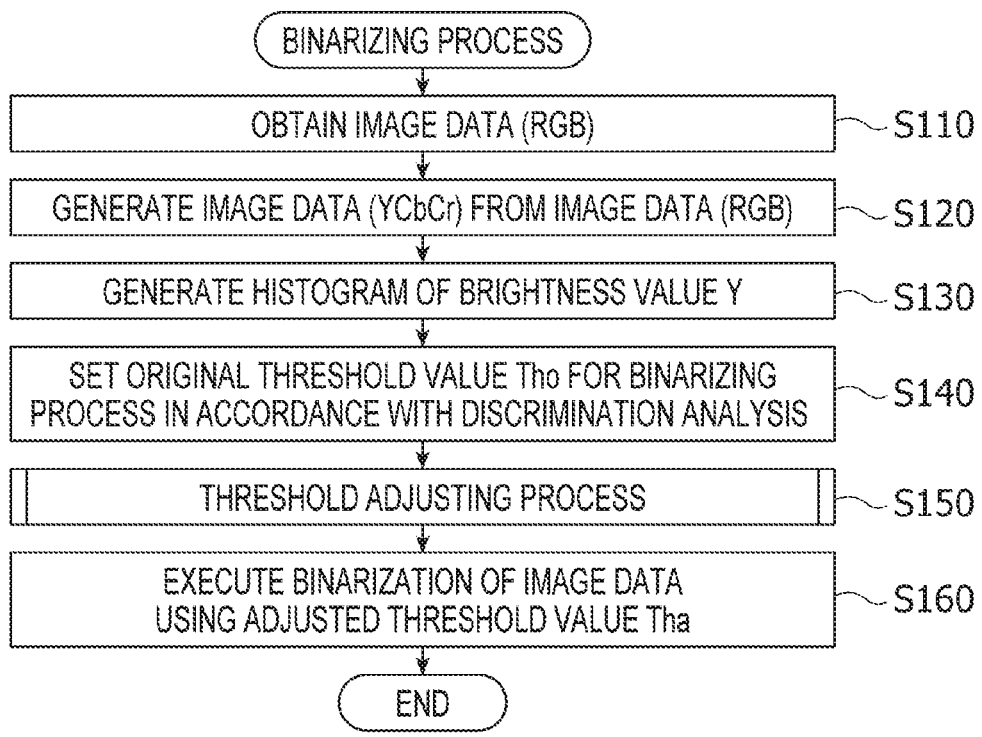
FIG. 3 is a flowchart illustrating a binarizing process according to the illustrative embodiment of the disclosures.

FIG. 3 is a flowchart illustrating the binarizing process according to the first illustrative embodiment. Further, FIGS. 4A-4F illustrate concrete examples of the binarizing process. When an instruction to execute the binarizing process is input from the PC 100 through the communication I/F 260, or such an instruction is input through the operation panel 250 of the scanner 200, the binarizing process is started.

When the binarizing process is started, the binarization processing part 220 of the scanner 200 (see FIG. 2) obtains image data to which the binarizing process (hereinafter, such data will be referred to as target image data) is to be applied (S110). According to the first illustrative embodiment, image data, which is generated as the original PA is read by the reading device 270 (see FIG. 1) of the scanner 200, is obtained as the target image data IF. It is noted that, according to the first illustrative embodiment, the target image data IF is so-called full color RGB data which is configured such that each of R (red), G (green) and B (blue) components are represented by 256-step (i.e., 8-bit) gradation values (0-255). It is noted that, in the following description, the R component, the G component and the B component of each pixel may occasionally be expressed as R, G and B, respectively. So are components Y, Cb and Cr, which will be described later.

FIG. 4A shows an example of the target image data IF. It is noted that the example shown in FIG. 4A represents the image data which is generated as the reading device 270 reads the original PA (e.g., a sales slip or a receipt), which includes black letters CHk, and letters CHg having a color close to the background color (hereinafter, referred to as approximate color letters) on a particular background BG. It is noted that, although the approximate color letters CHg are indicated with broken lines in FIG. 4A, the approximate color letters CHg are actually ones written with solid lines.

Next, the color converting part 221 generates YCbCr data from the target image data IF (RGB data) in S120 of FIG. 3. The YCbCr data is image data representing the color of each pixel with a brightness value Y and two color degrees (color difference components) of Cb (yellow-blue) and Cr (red-green). The YCbCr data is generated from the target image data IF in accordance with, for example, formulae F(1)-F(3) below. According to the first illustrative embodiment, the brightness value Y is expressed as a 256-step gradation value of which range is from 0 to +255, while each of the color difference components Cb and Cr is expressed as a 256-step gradation value of which range is from −127 to +128.

$$Y=0.299R+0.587G+0.114B \quad F(1)$$

$$Cb=-0.169R-0.331G+0.500B \quad F(2)$$

$$Cr=0.500R-0.419G-0.081B \quad F(3)$$

Next, the statistical processing part 224 generates a histogram of the brightness value Y of the target image data IF (S130).

FIG. 4B shows an example of the histogram of the brightness value Y of the target image data IF before adjustment. It is noted that FIG. 4B shows a frequency curve C1 connecting frequencies F for respective brightness values Y. In the example shown in FIG. 4B, the frequency curve C1 has three peaks which respectively correspond to the background BG, the black letters CHk and the approximate color letters CHg.

Next, based on the histogram of the brightness value Y as generated, the original threshold setting part 225 sets a threshold of the brightness value Y for the binarizing process (hereinafter, referred to as an original threshold value Tho) in S140 of FIG. 3. It is noted that setting of the original threshold value Tho is executed based on, for example, the discrimination analysis method known as Otsu method. The discrimination analysis is a method in which a threshold value A is varied from the minimum brightness value to the maximum brightness value in the brightness histogram, and determine the threshold value A at which a ratio of in-class variance to inter-class variance of two classes divided by the threshold value A becomes the largest as the threshold used for the binarizing process. In FIG. 4D, the original threshold value Tho as set is indicated as an example.

Figure 5:
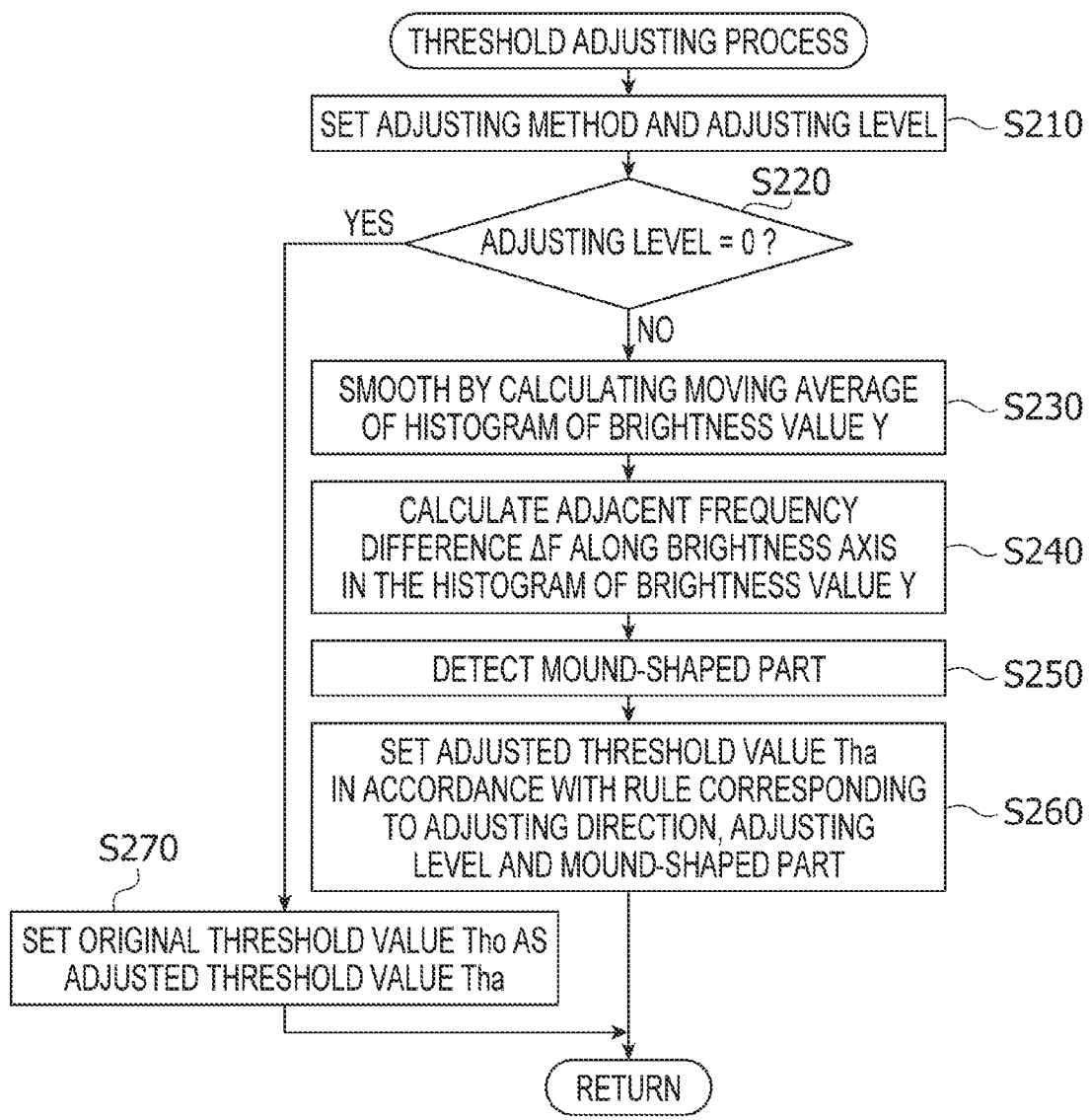
FIG. 5 is a flowchart illustrating a threshold adjusting process according to the illustrative embodiment.

Next, the post-adjustment threshold setting part 223 execute the threshold adjusting process (S150 of FIG. 3). The threshold adjusting process is a process to adjust the original threshold value Tho based on the set adjusting direction and adjusting level to set the adjusted threshold value Tha. FIG. 5 is a flowchart illustrating the threshold adjusting process. Further, FIGS. 6 and 7 show examples of a rule of the threshold adjusting process according to the illustrative embodiment.

In the threshold adjusting process, firstly, the adjusting direction setting part 227 and the adjusting level setting part 228 adjust the adjusting direction and the adjusting lever, respectively (S210 of FIG. 5). According to the illustrative embodiment, immediately before or after the binarizing process, the instruction acquiring part 229 receives user's instructions regarding the adjusting direction and the adjusting level through the operation panel 250. Then, the adjusting direction setting part 227 and the adjusting level setting part 228 set the adjusting direction and the adjusting level in accordance with the received instructions, respectively.

Figure 6:
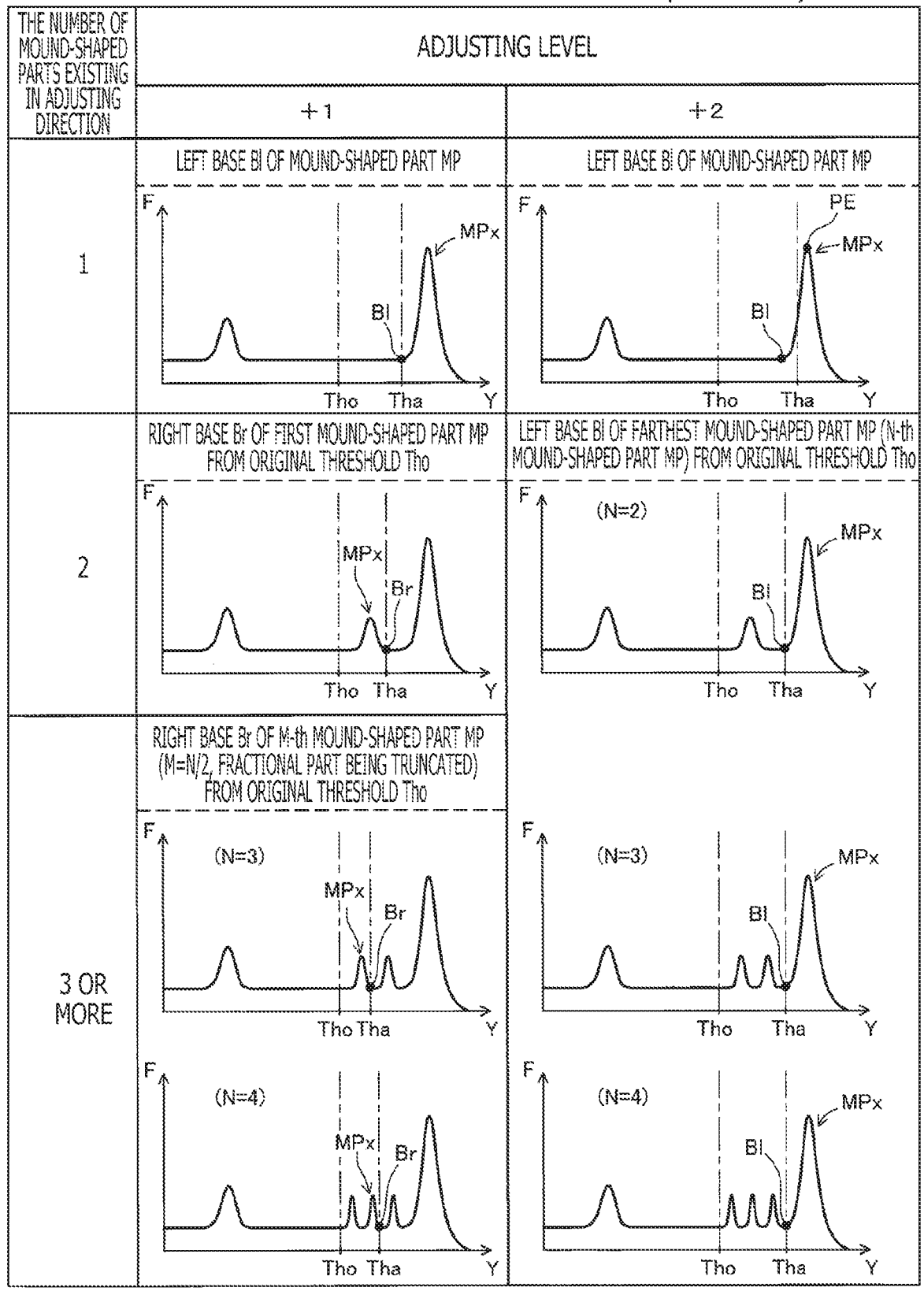
FIG. 6 shows an example of a rule for the threshold adjusting process.
Figure 7:
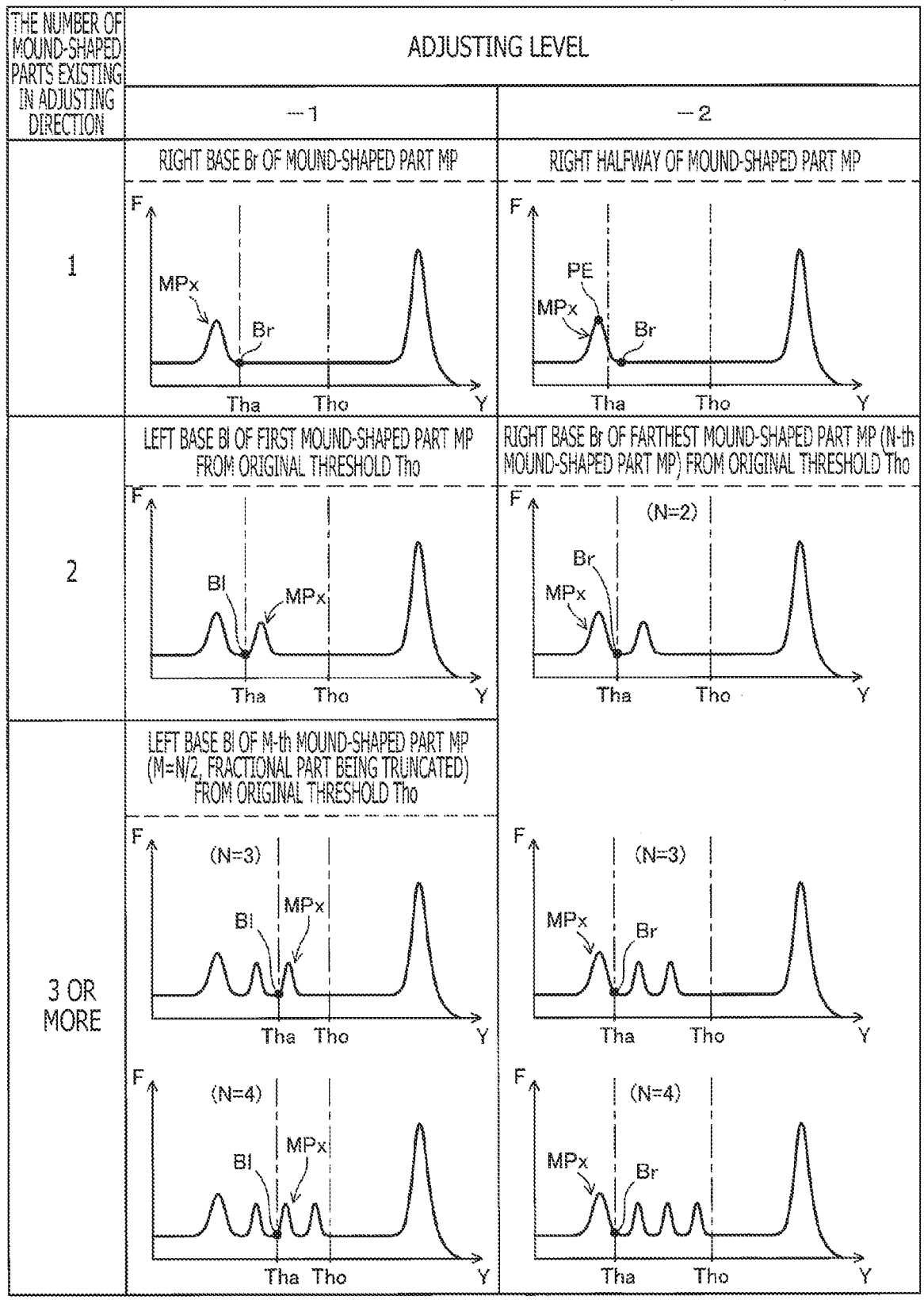
FIG. 7 shows another example of a rule for the threshold adjusting process.

According to the illustrative embodiment, as shown in FIGS. 6 and 7, the user can select, as the adjusting direction, a higher brightness direction (i.e., the right-side portion of the histogram of the brightness value Y) or a lower brightness direction (i.e., the left-side portion of the histogram of the brightness value Y). When the adjusting direction is set to the higher brightness direction, the threshold value is changed to a higher value (i.e., changed such that the adjusted threshold value Tha>the original threshold value Tho) in the threshold adjusting process. When the adjusting direction is set to the lower brightness direction, the threshold value is changed to a lower value (i.e., changed such that the adjusted threshold value Tha<the original threshold value Tho) in the threshold adjusting process.

In the example shown in FIGS. 4A-4F, in order to avoid a situation where the pixels corresponding to the approximate letters CHg in the target image data IF are converted into white pixels, but not to the black pixels in the binarized image data IB, the adjusting direction is set to the higher brightness direction. In order to avoid another situation where pixels at portions of the background among the lines constituting small letters in the target image data IF are converted into black pixels and the small letters are collapsed and blackened in the binarized image data IB, the adjusting direction is set to the lower brightness direction.

Further, according to the illustrative embodiment, two different threshold levels (i.e., the adjusted threshold level Tha and the original threshold level Tho) with respect to each of the higher brightness direction and the lower brightness direction. In the following description, between the two threshold levels in the higher brightness direction, one of which adjustment amount is smaller will be referred to as an adjusting level "+1" and one of which adjustment amount is greater will be referred to as an adjusting level "+2" as shown in FIG. 6. Further, between the two threshold levels in the lower brightness direction, one of which adjustment amount is smaller will be referred to as an adjusting level "−1" and one of which adjustment amount is greater will be referred to as an adjusting level "−2" as shown in FIG. 7. Furthermore, when the original threshold value Tho is set as the adjusted threshold value Tha (i.e., adjustment of the original threshold value Tho is not done), the adjusting level will be referred to "0".

Next, the post-adjustment threshold setting part 223 determines whether the set adjusting level is "0", that is, whether the original threshold level Tho is adjusted (S220 of FIG. 5). When it is determined that the adjusting level is "0" (S220: YES), the post-adjustment threshold setting part 223 sets the original threshold value Tho as the adjusted threshold value Tha (S270). Thereafter, control returns to the binarizing process, and S160 is executed.

Figure 8A:
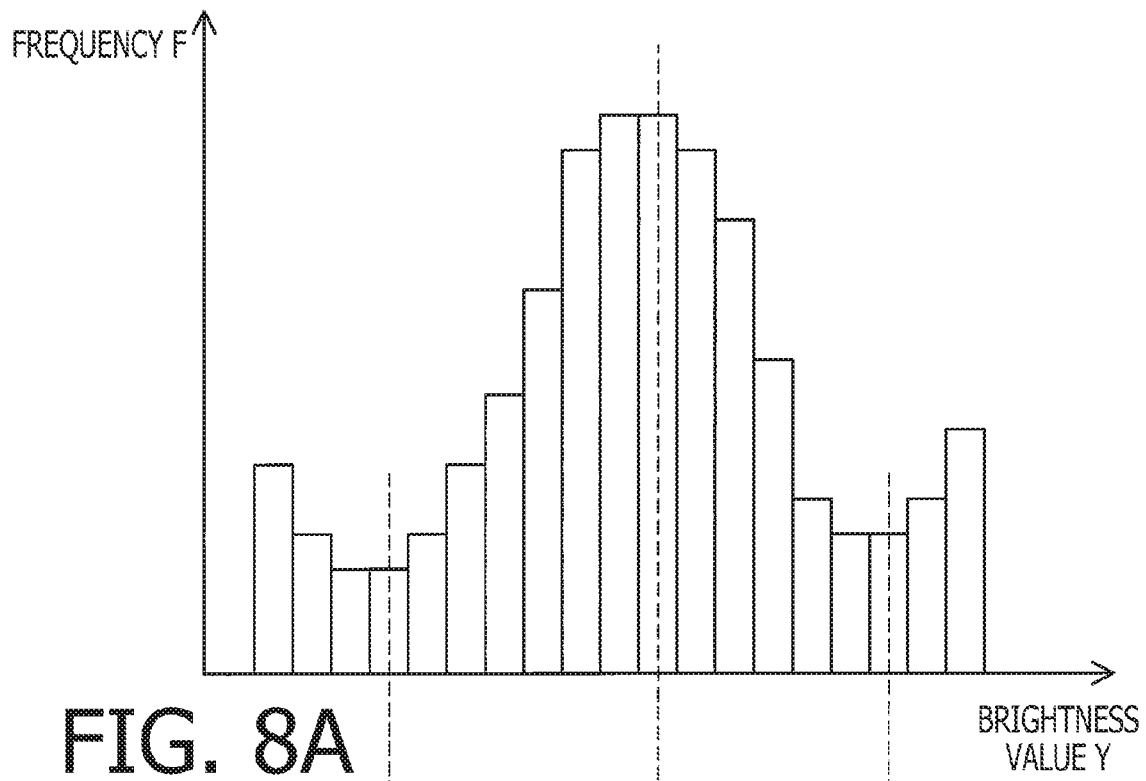
FIGS. 8A and 8B illustrate a method of detecting a mound-shaped part in a histogram of a brightness value.
Figure 8B:
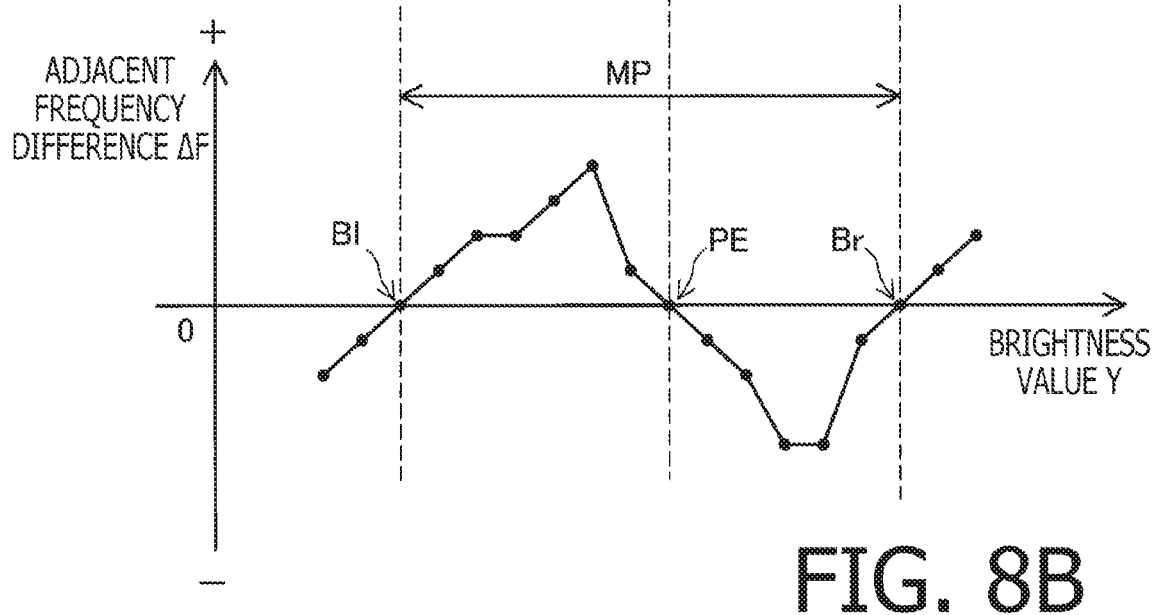

When it is determined that the adjusting level is not "0" (S220: NO), the mound-shaped part detecting part 226 executes a process of detecting a mound-shaped part MP satisfying a particular condition in the histogram of the brightness value Y (S230-S250). FIGS. 8A and 8B illustrate a method of detecting the mound-shaped part MP in the histogram of the brightness value Y. The mound-shaped part detecting part 226 firstly smoothes the histogram of the brightness value Y by applying moving average thereto (S230). FIG. 8A shows an example of the histogram of the brightness value Y after smoothing.

Next, the mound-shaped part detecting part 226 calculates an adjacent frequency difference ΔF along the brightness axis in the histogram of brightness value Y after smoothing. It is noted that the adjacent frequency difference ΔF is a difference between a frequency F(x) and a frequency F(x−1)

(i.e., ΔF=F(x)−F(x−1)), where F(x) is a frequency of a pixel of which brightness value Y is x, and F(x−1) is a frequency of a pixel of which brightness value Y is (x−1). Because of the above definition, the adjacent frequency difference ΔF has a positive value in a section where the frequency F increases in the higher brightness direction (i.e., right direction), while ΔF has a negative value in a section where the frequency F decrease in the higher brightness direction.

Next, based on the calculation result of the adjacent frequency differences ΔF, the mound-shaped part detecting part 226 detects the mound-shaped part MP (S250). Specifically, the mound-shaped part detecting part 226 determines a section, starting, in a direction where the brightness value Y increases (i.e., rightward in FIG. 8B), from a left base Bl of the mound-shaped part, which is a switching point at which the adjacent frequency differences ΔF change from a negative value to a positive value when the adjacent frequency differences ΔF subsequently exhibit positive values more than particular times (three times, according to the illustrative embodiment), via a peak PE, which is a switching point at which the adjacent frequency differences ΔF change from a positive value to the negative value when adjacent frequency differences ΔF subsequently exhibit negative values more than the particular times (three times, according to the illustrative embodiment) thereafter, ends at a right base Br of the mound-shaped part, which is a switching point at which the adjacent frequency differences ΔF change from a negative value to a positive value when the adjacent frequency differences ΔF become positive, and a frequency F at the peak PE of the section has a particular value (2% of the total number of pixels if the target image data IF, according to the illustrative embodiment) as the mound-shaped part MP. That is, according to the illustrative embodiment, a mound-shaped part of which peak has a relatively high frequency F in the histogram of the brightness value Y is detected as the mound-shaped part MP.

Next, the post-adjustment threshold setting part 223 sets the brightness value Y at a base (or a bottom) on a particular direction Dx side in the particular mound-shaped part MPx, which is one of the mound-shaped parts MP existing on the adjusting direction side with respect to the original threshold Tho in the histogram as the adjusted threshold value Tha (S260) in accordance with a rule corresponding to the set adjusting direction and adjusting level, and the number N of mound-shaped parts MP existing on the adjusting direction side with respect to the original threshold value Tho in the histogram of the brightness value Y. The rule referred to will be described below.

Firstly, a case where the adjusting direction is set to the "higher brightness direction (i.e., the rightward direction)" and the adjusting level is set to "+1" will be described referring to FIG. 6. In this case, when the number N of the mound-shaped parts MP existing in the adjusting direction side with respect to the original threshold value Tho is "1", the mound-shaped part MP is set as the particular mound-shaped part MPx, and the brightness value Y at the left base Bl of the particular mound-shaped part MPx is set as the adjusted threshold value Tha. That is, in this case, a direction opposite to the adjusting direction (leftward direction) is set as the particular direction Dx.

When the number N of the mound-shaped parts MP existing in the adjusting direction side with respect to the original threshold value Tho is "2", between the two mound-shaped parts MP on the adjusting direction side, a first mound-shaped part MP counting from the original threshold value Tho (i.e., the mound-shaped part MP closer to the original threshold value Tho) is set as the particular mound-shaped part MPx, and the brightness value Y at the right base Br of the particular mound-shaped part MPx is set as the adjusted threshold value Tha. That is, in this case, the adjusting direction (i.e., the rightward direction) is set as the particular direction Dx.

When the number N of the mound-shaped parts MP existing in the adjusting direction side with respect to the original threshold value Tho is "3 or greater", from among the mound-shaped parts MP on the adjusting direction side, an M-th (M=N/2, decimals being rounded down) mound-shaped part MP counting from the original threshold value Tho is set as the particular mound-shaped part MPx, and the brightness value Y at the right base of the mound-shaped part Br of the particular mound-shaped part MPx is set as the adjusted threshold value Tha. That is, in this case, the adjusting direction (i.e., the rightward direction) is set as the particular direction Dx. For example, when N=3, the brightness value Y at the right base Br of the first mound-shaped part MP counting from the original threshold value Tho is set as the adjusted threshold value Tha. When N=4, the brightness value Y at the right base Br of the second mound-shaped part MP counting from the original threshold value Tho is set as the adjusted threshold value Tha.

Next, a case where the adjusting direction is set to the "higher brightness direction (rightward direction)" and the adjusting level is set to "+2" will be described referring to FIG. 6. In this case, when the number N of the mound-shaped parts MP existing in the adjusting direction side with respect to the original threshold value Tho is "1", the mound-shaped part MP is set as the particular mound-shaped part MPx, and the brightness value Y at a left hillside, which is a halfway point between the left base Bl and the peak PE, of the particular mound-shaped part MPx is set as the adjusted threshold value Tha. That is, in this case, a direction opposite to the adjusting direction (i.e., the leftward direction) is set as the particular direction Dx.

When the number N of the mound-shaped parts MP existing in the adjusting direction side with respect to the original threshold value Tho is "2 or greater" (i.e., "2" or "3 or greater"), among the mound-shaped parts MP on the adjusting direction side, the farthest mound-shaped part MP from the original threshold value Tho (i.e., an N-th mound-shaped part MP counting from the original threshold value Tho) is set as the particular mound-shaped part MPx, and the brightness value Y at the left hillside of the particular mound-shaped part MPx is set as the adjusted threshold value Tha. That is, in this case, a direction opposite to the adjusting direction (i.e., the leftward direction) is set as the particular direction Dx.

Next, a case where the adjusting direction is set to the "lower brightness direction (leftward direction)" and the adjusting level is set to "−1" will be described referring to FIG. 7. In this case, when the number N of the mound-shaped parts MP existing in the adjusting direction side with respect to the original threshold value Tho is "1", the mound-shaped part MP is set as the particular mound-shaped part MPx, and the brightness value Y at the right base Br of the particular mound-shaped part MPx is set as the adjusted threshold value Tha. That is, in this case, a direction opposite to the adjusting direction (i.e., the rightward direction) is set as the particular direction Dx.

When the number N of the mound-shaped parts MP existing in the adjusting direction side with respect to the original threshold value Tho is "2", between the two mound-shaped parts MP on the adjusting direction side, a first mound-shaped part MP counting from the original threshold value Tho (i.e., the mound-shaped part MP closer to the original threshold value Tho) is set as the particular mound-shaped part MPx, and the brightness value Y at the left base Bl of the particular mound-shaped part MPx is set as the adjusted threshold value Tha. That is, in this case, the adjusting direction (i.e., the leftward direction) is set as the particular direction Dx.

When the number N of the mound-shaped parts MP existing in the adjusting direction side with respect to the original threshold value Tho is "3 or greater", from among the mound-shaped parts MP on the adjusting direction side, an M-th (M=N/2, decimals being rounded down) mound-shaped part MP counting from the original threshold value Tho is set as the particular mound-shaped part MPx, and the brightness value Y at the left base Bl of the particular mound-shaped part MPx is set as the adjusted threshold value Tha. That is, in this case, the adjusting direction (i.e., the leftward direction) is set as the particular direction Dx. For example, when N=3, the brightness value Y at the left base Bl of the first mound-shaped part MP counting from the original threshold value Tho is set as the adjusted threshold value Tha. When N=4, the brightness value Y at the left base Bl of the second mound-shaped part MP counting from the original threshold value Tho is set as the adjusted threshold value Tha.

Next, a case where the adjusting direction is set to the "lower brightness direction (leftward direction)" and the adjusting level is set to "−2" will be described referring to FIG. 7. In this case, when the number N of the mound-shaped parts MP existing in the adjusting direction side with respect to the original threshold value Tho is "1", the mound-shaped part MP is set as the particular mound-shaped part MPx, and the brightness value Y at a right hillside, which is a halfway point between the right base Br and the peak PE, of the particular mound-shaped part MPx is set as the adjusted threshold value Tha. That is, in this case, a direction opposite to the adjusting direction (i.e., the rightward direction) is set as the particular direction Dx.

When the number N of the mound-shaped parts MP existing in the adjusting direction side with respect to the original threshold value Tho is "2 or greater" (i.e., "2" or "3 or greater"), among the mound-shaped parts MP on the adjusting direction side, the farthest mound-shaped part MP from the original threshold value Tho (i.e., an N-th mound-shaped part MP counting from the original threshold value Tho) is set as the particular mound-shaped part MPx, and the brightness value Y at the right hillside of the particular mound-shaped part MPx is set as the adjusted threshold value Tha. That is, in this case, a direction opposite to the adjusting direction (i.e., the rightward direction) is set as the particular direction Dx.

As above, according to the illustrative embodiment, when the adjusted level as set is a level other than "0", the brightness value Y at a base (or a bottom) on a particular direction Dx side in the particular mound-shaped part MPx, which is one of the mound-shaped parts MP existing on the adjusting direction side with respect to the original threshold Tho in the histogram as the adjusted threshold value Tha (S250) in accordance with a rule corresponding to the set adjusting direction and adjusting level, and the number N of mound-shaped parts MP existing on the adjusting direction side with respect to the original threshold value Tho in the histogram of the brightness value Y. FIG. 4F shows an example of the adjusted threshold value Tha as set. Thereafter, control returns to the binarizing process (FIG. 3), and S160 is executed.

Next, the binarization processing part 220 applies the binarizing process to the target image data IF using the adjusted threshold value Tha to generate the binarized image data IB (S160). Specifically, the binarization processing part 220 converts, from among the multiple pixels constituting the target image data IB, pixels of which brightness values Y are equal to or smaller than the adjusted threshold value Tha to the black pixels, while pixels of which brightness values Y are greater than the adjusted threshold value Tha to the white pixels.

According to the illustrative embodiment, the binarized image data IB is generated as the RGB data similarly to the target image data IF, the gradation values of the black pixels are specified by (R, G, B)=(0, 0, 0), while the gradation values of the white pixels are specified by (R, G, B)=(255, 255, 255).

In the histogram of the brightness value Y shown in FIG. 4F, the pixels distributed on the left side with respect to a line indicating the adjusted threshold value Tha are converted to the black pixels, while the pixels distributed on the right side with respect to the line indicating the adjusted threshold value Tha are converted to the white pixels. In the example shown in FIG. 4F, the brightness values Y of the pixels at a portion of the approximate color letter CHg in the target image data IF is smaller than the adjusted threshold value Tha. Therefore, as shown in FIG. 4E, the approximate color letters CHg within the target image data IF remain as the black letters CHk, but not being deleted in the binarized image data IB.

If the threshold adjusting process described above (S150) is not executed, since the brightness value Y of the pixels corresponding to the approximate color letters CHg of the target image data IF is higher than the original threshold value Tho as shown in FIG. 4D, the pixels corresponding to the approximate color letters CHg are converted to the white pixels in the binarizing process. Therefore, if the above-described threshold adjusting process is not executed, the approximate color letters CHg in the target image data IF disappear as shown in FIG. 4C in the binarized image data IBa.

As described above, in the binarizing process executed according to the illustrative embodiment, the histogram generating part 224 generates the histogram of the brightness value Y of multiple pixels constituting the target image data IF, the original threshold setting part 225 sets the original threshold Tho for the binarizing process based on the histogram, the mound-shaped part detecting part 226 detects the mound-shaped part MP satisfying a particular condition in the histogram, the adjusting direction setting part 227 sets the adjusting direction of the original threshold Tho, the post-adjustment threshold setting part 223 sets the brightness value Y at the base, on the particular direction Dx, of the particular mound-shaped part MP which is one the mound-shaped parts MP existing on the adjusting direction with respect to the original threshold value Tho in the histogram as the adjusted threshold value Tha, and the binarization processing part 220 executes the binarizing processing of the target image data IB using the adjusted threshold value Tha.

Therefore, according to the illustrative embodiment, the adjusted threshold value Tha can be set in accordance with characteristic features of the target image data IB such as a location and a size of the mound-shaped part MP. Specifically, the adjusted threshold value Tha can be set such that the pixels corresponding to the particular mound-shaped part MPx existing in the adjusting direction in the histogram can be collectively converted in to the white pixels or the black pixels in the binarization process. Therefore, with the scanner 200 according to the illustrative embodiment, occurrence of a situation where desired results are not obtained in the binarizing process can be suppressed.

For example, with the scanner 200 according to the illustrative embodiment, a situation where the pixels corresponding to a character having the approximate color are converted to the white pixels and the letter disappears in the binarized image data, or a situation where pixels corresponding to the background portions among lines constituting small characters and having a background color are converted into the black pixels and the characters are collapsed and blackened in the binarized image data can be suppressed.

In the binarizing process according to the illustrative embodiment, the instruction acquiring part 229 receives the user's instruction, and the adjusting direction setting part 227 sets the adjusting direction in accordance with the received instruction. Therefore, with the scanner 200 according to the illustrative embodiment, the adjusted threshold value Tha, which is generated by adjusting the original threshold value Tho into a desired direction, can be set. For example, when the user wishes that the pixels having the approximate color are converted into the black pixels, but not to the white pixels, such a result can be obtained by setting the adjusting direction to the higher brightness direction. Further, when the user wishes that the pixels corresponding to the background portions among lines constituting small characters and having a background color are converted into the white pixels but not to the black pixels, such a result can be obtained by setting the adjusting direction to the lower brightness direction.

Further, in the binarizing process according to the illustrative embodiment, the post-adjustment threshold setting part 223 selects the particular mound-shaped part MPx and the particular direction Dx in accordance with a rule, which is set in association with the number N of the mound-shaped part MP existing on the adjusting direction with respect to the original threshold value Tho in the histogram of the brightness value Y. Therefore, according to the illustrative embodiment, an appropriate particular mound-shaped part MPx and an appropriate particular direction Dx are selected in accordance with the characteristic features of the target image data IF (i.e., the number N of the mound-shaped part MP existing on the adjusting direction with respect to the original threshold value Tho in the histogram of the brightness value Y), a situation where the desired result cannot be obtained in the binarizing process can be effectively suppressed.

Furthermore, in the binarizing process according to the illustrative embodiment, the adjusting level setting part 228 sets the adjusting level (i.e., an adjusting amount) to be applied to the original threshold Tho, and the post-adjustment threshold setting part 223 selects the particular mound-shaped part MPx and the particular direction Dx in accordance with the rule which is set according to the adjusting level. Therefore, according to the illustrative embodiment, an appropriate adjusted threshold value Tha can be set by selecting an appropriate particular mound-shaped part MPx and an appropriate direction Dx in accordance with the adjusting level as set, and a situation where a desired result cannot be obtained in the binarizing process can be effective suppressed.

It is noted that, in the binarizing process according to the illustrative embodiment, the instruction acquiring part 229 obtains the user's instruction and the adjusting level setting part 228 sets the adjusting level in accordance with the user's instruction as obtained. Therefore, according to the illustrative embodiment, an appropriate adjusted threshold value Tha can be set by selecting an appropriate particular mound-shaped part MPx and an appropriate direction Dx in accordance with the user-desired adjusting level, and a situation where a desired result cannot be obtained in the binarizing process can be effective suppressed.

Still further, in the binarizing process according to the illustrative embodiment, when the number N of the mound-shaped part MP existing on the adjusting direction side with respect to the original threshold Tho in the histogram of the brightness value Y is one, (1) if the adjusting level is set to a first level (i.e., "+1" or "−1"), the post-adjustment threshold setting part 223 sets a direction opposite to the adjusting direction as the particular direction Dx, while (2) if the adjusting level is set to a second level (i.e., "+2" or "−2"), which has a greater adjusting amount than the first level, the post-adjustment threshold setting part 223 sets the brightness value Y corresponding to a position between a base on a side opposite to the adjusting direction and a peak, instead of the base of the mound-shaped part MP, of the mound-shaped part MP as the adjusted threshold value Tha.

Therefore, according to the illustrative embodiment, a desired result according to the characteristic feature of the target image data and the adjusting level as set can be obtained. For example, when the adjusting level is set to "+1", it is possible to remain light-colored characters having a different color from the background color can be remained as black characters in the binarized image data. When the adjusting level is set to "+2", characters having relatively low brightness of which color is close to the background color can be remained as black characters in the binary image data. When the adjusting level is set to "−1", characters other than the thickest characters in the image can be converted to white characters (i.e., disappear) in the binarized image data. When the adjusting level is set to "−2", characters other than the thickest characters can be converted to white characters, and further, collapse of small characters by the background color can be suppressed in the binarized image data.

Furthermore, in the binarizing process according to the illustrative embodiment, when the number N of the mound-shaped part MP existing on the adjusting direction side with respect to the original threshold Tho in the histogram of the brightness value Y is two, (1) if the adjusting level is set to the first level (i.e., "+1" or "−1"), the post-adjustment threshold setting part 223 selects the mound-shaped part MP closer to the original threshold value Tho as the particular mound-shaped part MPx, and sets the adjusting direction as the particular direction Dx, while (2) if the adjusting level is set to a second level (i.e., "+2" or "−2"), which has a larger adjusting amount than the first level, the post-adjustment threshold setting part 223 selects a farther mound-shaped part MP from the original threshold value Tho as the particular mound-shaped part MPx, and sets a direction opposite to the adjusting direction as the particular direction Dx.

Therefore, according to the illustrative embodiment, a desired result according to the characteristic feature of the target image data and the adjusting level as set can be obtained. For example, when the adjusting level is set to "+1", it is possible to remain light-colored characters having a different color from the background color can be remained as black characters in the binarized image data. When the adjusting level is set to "+2", characters having relatively low brightness of which color is close to the background color can be remained as black characters in the binary image data. When the adjusting level is set to "−1", characters other than the thickest characters in the image can be converted to white characters (i.e., disappear) in the binarized image data. When the adjusting level is set to "−2", characters other than the thickest characters can be converted to white characters, and further, collapse of small characters by the background color can be suppressed in the binarized image data.

Furthermore, in the binarizing process according to the illustrative embodiment, when the number N of the mound-shaped part MP existing on the adjusting direction side with respect to the original threshold Tho in the histogram of the brightness value Y is N (N being an integer greater than two), (1) if the adjusting level is set to the first level (i.e., "+1" or "−1"), the post-adjustment threshold setting part 223 selects the M-th (M=N/2, decimals being rounded down), mound-shaped part MP counting from the original threshold value Tho as the particular mound-shaped part MPx, and sets the adjusting direction as the particular direction Dx, while (2) if the adjusting level is set to the second level (i.e., "+2" or "−2"), which has a larger adjusting amount than the first level, the post-adjustment threshold setting part 223 selects a farthest mound-shaped part MP from the original threshold value Tho as the particular mound-shaped part MPx, and sets a direction opposite to the adjusting direction as the particular direction Dx.

Therefore, according to the illustrative embodiment, a desired result according to the characteristic feature of the target image data and the adjusting level as set can be obtained. For example, when the adjusting level is set to "+2", it is possible to remain light-colored characters having a different color from the background color can be remained as black characters in the binarized image data. When the adjusting level is set to "+1", intermediate adjustment between cases where the adjusting level are respectively set to "+2" and "0" (i.e., no adjustment) can be executed. When the adjusting level is set to "−2", characters other than the thickest characters in the image can be converted to white characters (i.e., disappear) in the binarized image data. When the adjusting level is set to "−1", intermediate adjustment between cases where the adjusting level are respectively set to "−2" and "0" (i.e., no adjustment) can be executed.

Further, in the binarizing process according to the illustrative embodiment, the mound-shaped part detecting part 226 calculates, in the histogram of the brightness value Y, a difference (i.e., adjacent frequency difference ΔF) between a frequency F at a brightness value Y, and another frequency at a one-step lower brightness value Y, sequentially over the range of the brightness values Y of the histogram. Then, the mound-shaped part detecting part 226 determines a section, starting, in the direction where the brightness values change from a lower value to a higher value, from the first base (i.e., the left base Bl) which is a switching point where the adjacent frequency differences ΔF are changed from a negative value to a positive value when the adjacent frequency differences ΔF continuously have positive values by a particular number of times, through the peak PE which is a switching point where the frequency differences ΔF are thereafter changed from a positive value to a negative value when the frequency difference ΔF continuously have negative values by a particular number of times, to the second base (i.e., the right base Br) which is a switching point where the adjacent frequency differences ΔF are thereafter changed from a negative value to a positive value when the adjacent frequency difference ΔF becomes positive, as the mound-shaped part MP.

According to the illustrative embodiment, an appropriate mound-shaped part MP representing the characteristic feature of the target image data IF can be detected, and an appropriate adjusted threshold value Tha can be set. It is noted that, according to the illustrative embodiment, the mound-shaped part detecting part 226 detects the section of which the frequency F at the peak PE has a particular value or greater as the mountain part MP. Therefore, according to the illustrative embodiment, an appropriate mound-shaped part MP representing the characteristic feature of the target image data IF can be detected, and an appropriate adjusted threshold value Tha can be set.

B. Modifications

The technique disclosed in this specification should not be limited to the above-described embodiment, and various modifications are available without departing from the aspects of the disclosures. Examples of such modifications will be described below.

It is noted that the configuration of the image processing system 10 described above is only an example and various modification could be available without departing from the aspects of the disclosures. For example, the binarization processing part 220 of the scanner 200 does not necessarily have functions of the adjusting level setting part 228 or the instruction acquiring part 229.

The binarizing process according to the illustrative embodiment is only an example, and a part of steps may be omitted or modified, or order of steps may be changed. According to the above-described illustrative embodiment, the reading device 270 of the scanner 200 reads the original PA and generates the target image data IF. Such a configuration may be modified such that, for example, the target image data IF may be image data received from another apparatus (e.g., the PC 100) through the communication I/F 260 or the like. Further, the target image data IF is not necessarily be RGB data, but image data expressed in accordance with another color model (color space), or monochromatic image (grayscale image).

In the binarizing process according the above-described illustrative embodiment, the histogram of the brightness value Y is used. Instead of such a histogram, a histogram of another index value representing the brightness (e.g., G component of the RGB signal) may be used.

The detection method of the mound-shaped part MP in the binarizing process according to the illustrative embodiment is only an example, and can be modified in various ways. For example, the smoothing process by obtaining the moving average of the histogram of the brightness value Y is not necessarily be executed. Further, a condition, to detect the mound-shaped part MP, that the frequency f at the peak PE is equal to or greater than the particular value may be omitted.

In the binarizing process according to the illustrative embodiment, the adjusting level is selectable from two different levels. This configuration may be modified such that the adjusting level is selectable from three or more different levels. Alternatively, the configuration may be modified such that selection of the adjusting level is not available (i.e., only one selection level is available).

In the binarizing process according to the illustrative embodiment, the adjusting direction and the adjusting level are set in accordance with the user's instructions. This configuration may be modified such that the adjusting direction and/or the adjusting level may be automatically set based on the target image data IF. For example, a positional relationship of pixel groups constituting two mound-shaped parts MP of the histogram of the brightness value Y in the target image data IF are determined. When, in the target image data IF, the positions of the both pixel groups overlap (i.e., when one group of pixels on the lower brightness side correspond to character portion of the image, and the other group of pixels on the higher brightness side correspond to the background), the adjusting direction and the adjusting level are set so that the adjusted threshold value Tha is locate between the two mound-shaped parts MP. According to such a configuration, the character portions are remained, while the background of the characters can be deleted in the binarized image data IF.

When a positional relationship of pixel groups constituting two mound-shaped parts MP of the histogram of the brightness value Y in the target image data IF are determined, and when, in the target image data IF, the positions of the both pixel groups do not overlap (e.g., when both groups represent character part), the adjusting direction and the adjusting level may be set such that the adjusted threshold value Tha is located on the higher brightness side with respect to the two mound-shaped parts MP. According to such a configuration, two character parts corresponding to the two mound-shaped parts MP can be remained in the binary image data.

In the binarizing process according to the illustrative embodiment, the mound-shaped part MP of which frequency F is the greatest among the mound-shaped parts MP existing on the adjusting direction side with respect to the original threshold value Tho in the histogram of the brightness value Y may be selected as the particular mound-shaped part MPx, and a direction opposite to the adjusting direction may be set as the particular direction Dx. With this configuration, a desired result according to the characteristic feature can be obtained in the binarizing process.

According to the illustrative embodiment, as a setting method of the original threshold Tho, the discrimination analysis method (Otsu method) is employed. As far as a method is to set the original threshold value Tho based on the histogram, any other method could be used.

In the above-described illustrative embodiment, instead of the process of generating the YCbCr data from the target image data, calculation of the brightness values Y based on the target image data IFR may be executed.

In the above-described illustrative embodiment, the binarizing process is executed by the scanner 200. Such a configuration may be modified such that the binarizing process may be executed by another image processing apparatus (e.g., the PC 100 or not-shown printer). For example, the binarizing process may be executed by the CPU 112 when it executes a scanner driver or other application programs stored in the storage 114 of the PC 100.

In the above-described illustrative embodiments, a part of the configuration realized by hardware may be replaced with software. Further, in the above-described illustrative embodiments, a part of the configuration realized by software may be replaced with hardware.

What is claimed is:

1. An image processing apparatus, comprising:
a storage configured to store image data representing a color image, the image data being constituted by multiple pixels, each of the multiple pixels having a gradation value; and
a controller,
wherein the controller is configured to:
generate a histogram of index values corresponding to quantities of the brightness values of the multiple pixels constituting the image data stored in the storage;
set an original threshold index value based on the histogram;
detect a mound-shaped part, in the histogram, satisfying a particular condition;
set an adjusting direction in the histogram in which the original threshold index value is to be adjusted;
set an index value at a base on a particular direction side, in the histogram, of a particular mound-shaped part which is one of mound-shaped parts existing on the adjusting direction side in the histogram with respect to the original threshold index value in the histogram as an adjusted threshold value; and
apply a binarizing process to the image data using the adjusted threshold value,
wherein the controller is further configured to select the particular mound-shaped part and the particular direction in the histogram in accordance with a rule which is set in association with a number of mound-shaped parts existing in the adjusting direction in the histogram with respect to the original threshold index value in the histogram, the number of mount-shaped parts being more than one.

2. The image processing apparatus according to claim 1, wherein the controller is further configured to:
receive a user instruction; and
set the adjusting direction in accordance with the user instruction.

3. The image processing apparatus according to claim 1, wherein the controller is further configured to:
set an adjusting level representing an adjusting level of the original threshold index value; and
select the particular mound-shaped part and the particular direction in accordance with a rule which is set in association with the adjusting level.

4. The image processing apparatus according to claim 3, wherein the controller is further configured to:
receive a user instruction; and
set the adjusting level in accordance with the received user instruction.

5. The image processing apparatus according to claim 3, wherein, when a number of the mound-shaped parts existing on the adjusting direction side with respect to the original threshold index value in the histogram is two, the controller is configured to:
(1) when the adjusting level is set to a first level, select the mound-shaped part closer to the original threshold index value as the particular mound-shaped part, and set the adjusting direction as the particular direction; and
(2) when the adjusting level is set to a second level, which has a larger adjusting amount than the first level, select a farther mound-shaped part from the original threshold index value as the particular mound-shaped part, and set a direction opposite to the adjusting direction as the particular direction.

6. The image processing apparatus according to claim 3, wherein, when the number of the mound-shaped parts existing on the adjusting direction side with respect to the original threshold index value in the histogram is N which is an integer greater than two, the controller is configured to:
(1) when the adjusting level is set to a first level, select an M-th mound-shaped part MP counting from the original threshold index value as the particular mound-shaped part, and set the adjusting direction as the particular direction, M=N/2 with decimals being rounded down;
(2) when the adjusting level is set to a second level, which has a larger adjusting amount than the first level, select an N-th mound-shaped part, which is a farthest mound-shaped part, from the original threshold index value as the particular mound-shaped part, and sets a direction opposite to the adjusting direction as the particular direction.

7. The image processing apparatus according to claim 1, wherein the controller is configured to:
   select a mound-shaped part exhibiting a highest frequency from among mound-shaped parts existing on the adjusting direction side with respect to the original threshold index value in the histogram as the particular mound-shaped part; and
   set a direction opposite to the adjusting direction as the particular direction.

8. The image processing apparatus according to claim 1, wherein the controller is configured to:
   calculate a difference between a frequency at an index value, and another frequency at a one-step lower index value, sequentially over the range of the index values of the histogram; and
   determine a section, starting, in the direction where the index values change from a lower value to a higher value, from the first base which is a switching point where the adjacent frequency differences are changed from a negative value to a positive value when the adjacent frequency differences continuously have positive values by a particular number of times, through a peak which is a switching point where the frequency differences are thereafter changed from a positive value to a negative value when the frequency difference continuously have negative values by a particular number of times, to the second base which is a switching point where the adjacent frequency differences are thereafter changed from a negative value to a positive value when the adjacent frequency difference becomes positive, as the mound-shaped part.

9. The image processing apparatus according to claim 8, wherein the controller is configured to detect a part of the section within which the frequency at the peak is a particular value or greater as the mounter part.

10. An image processing method employed in an image processing apparatus having a storage configured to store image data representing a color image, the image data being constituted by multiple pixels, each of the multiple pixels having a gradation value,
    the method comprising:
    generating a histogram of index values corresponding to quantities of the brightness values of the multiple pixels constituting the image data stored in the storage;
    setting an original threshold index value based on the histogram;
    detecting a mound-shaped part, in the histogram, satisfying a particular condition;
    setting an adjusting direction in the histogram in which the original threshold index value is to be adjusted;
    setting an index value at a base on a particular direction side, in the histogram, of a particular mound-shaped part which is one of mound-shaped parts existing on the adjusting direction side in the histogram with respect to the original threshold index value in the histogram as an adjusted threshold value; and
    applying a binarizing process to the image data using the adjusted threshold value,
    wherein the controller is further configured to select the particular mound-shaped part and the particular direction in the histogram in accordance with a rule which is set in association with a number of mound-shaped parts existing in the adjusting direction in the histogram with respect to the original threshold index value in the histogram, the number of mount-shaped parts being more than one.

11. An image processing apparatus, comprising:
    a storage configured to store image data representing a color image, the image data being constituted by multiple pixels, each of the multiple pixels having a gradation value; and
    a controller,
    wherein the controller is configured to:
    generate a histogram of index values corresponding to quantities of the brightness values of the multiple pixels constituting the image data stored in the storage;
    set an original threshold index value based on the histogram;
    detect a mound-shaped part, in the histogram, satisfying a particular condition;
    set an adjusting direction in which the original threshold index value is to be adjusted;
    set an index value at a base on a particular direction side of a particular mound-shaped part which is one of mound-shaped parts existing on the adjusting direction side with respect to the original threshold index value in the histogram as an adjusted threshold value; and
    apply a binarizing process to the image data using the adjusted threshold value,
    set an adjusting level representing an adjusting level of the original threshold index value; and
    select the particular mound-shaped part and the particular direction in accordance with a rule which is set in association with the adjusting level;
    wherein, when a number of the mound-shaped parts existing on the adjusting direction side with respect to the original threshold index value in the histogram is one, the controller is configured to:
    (1) when the adjusting level is set to a first level, set a direction opposite to the adjusting direction as the particular direction;
    (2) when the adjusting level is set to a second level, which has a larger adjusting amount than the first level, set the brightness value corresponding to a position between a base on a side opposite to the adjusting direction and a peak, instead of the base of the mound-shaped part, of the mound-shaped part as the adjusted threshold value.

12. An image processing apparatus, comprising:
    a storage configured to store image data representing a color image, the image data being constituted by multiple pixels, each of the multiple pixels having a gradation value; and
    a controller,
    wherein the controller is configured to:
    generate a histogram of index values corresponding to quantities of the brightness values of the multiple pixels constituting the image data stored in the storage;
    set an original threshold index value based on the histogram;
    detect a mound-shaped part, in the histogram, satisfying a particular condition;
    set an adjusting direction in which the original threshold index value is to be adjusted;
    set an index value at a base on a particular direction side of a particular mound-shaped part which is one of mound-shaped parts existing on the adjusting direction side with respect to the original threshold index value in the histogram as an adjusted threshold value;
    apply a binarizing process to the image data using the adjusted threshold value;

calculate a difference between a frequency at an index value, and another frequency at a one-step lower index value, sequentially over the range of the index values of the histogram; and determine a section, starting, in the direction where the index values change from a lower value to a higher value, from the first base which is a switching point where the adjacent frequency differences are changed from a negative value to a positive value when the adjacent frequency differences continuously have positive values by a particular number of times, through a peak which is a switching point where the frequency differences are thereafter changed from a positive value to a negative value when the frequency difference continuously have negative values by a particular number of times, to the second base which is a switching point where the adjacent frequency differences are thereafter changed from a negative value to a positive value when the adjacent frequency difference becomes positive, as the mound-shaped part.

* * * * *